US012572754B2

(12) United States Patent
Arunkumar et al.

(10) Patent No.: US 12,572,754 B2
(45) Date of Patent: Mar. 10, 2026

(54) METHOD AND SYSTEM FOR GENERATING CONTEXTUAL EXPLANATION FOR MODEL PREDICTIONS

(71) Applicant: Tata Consultancy Services Limited, Mumbai (IN)

(72) Inventors: Jayashree Arunkumar, Chennai (IN); Ravindran Subbiah, Thiruvananthapuram (IN); Jyoti Bhat, Bangalore (IN); Amit Kalele, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 166 days.

(21) Appl. No.: 18/522,535

(22) Filed: Nov. 29, 2023

(65) Prior Publication Data

US 2024/0184996 A1     Jun. 6, 2024

(30) Foreign Application Priority Data

Dec. 1, 2022    (IN) .............................. 202221069384

(51) Int. Cl.
| | |
|---|---|
| *G06F 16/242* | (2019.01) |
| *G06F 40/40* | (2020.01) |
| *G06N 5/045* | (2023.01) |

(52) U.S. Cl.
CPC ............ *G06F 40/40* (2020.01); *G06F 16/243* (2019.01); *G06N 5/045* (2013.01)

(58) Field of Classification Search
CPC ............................. G06N 5/045; G06F 16/243
See application file for complete search history.

(56) References Cited

U.S. PATENT DOCUMENTS

| | | | |
|---|---|---|---|
| 2014/0149446 A1* | 5/2014 | Kuchmann-Beauger | ................... G06F 16/283 707/763 |
| 2022/0391670 A1* | 12/2022 | Dalli | ..................... G06F 16/284 |

FOREIGN PATENT DOCUMENTS

| | | |
|---|---|---|
| WO | WO 2022/079107 A1 | 4/2022 |
| WO | WO 2022/101452 A1 | 5/2022 |
| WO | WO 2022/101515 A1 | 5/2022 |

OTHER PUBLICATIONS

Anjomshoae et al., "Explanations of Black-Box Model Predictions by Contextual Importance and Utility," (2019).
(Continued)

*Primary Examiner* — Feng-Tzer Tzeng
(74) *Attorney, Agent, or Firm* — Finnegan, Henderson, Farabow, Garrett & Dunner, LLP

(57) ABSTRACT

Human-understandable explanations of Artificial Intelligence (AI) based models are crucial to building transparency and trust in AI based solutions. More importantly, these explanations need to be contextual, applicable to the domain the model is used in and relevant to the concerned stakeholder. Conventionally, there is a lack of communicating these explanations to various stakeholders in a language that they can understand and relate to. The present disclosure facilitates the conversational agents (chat bots) with intelligence and actions that would help them communicate the right information to the right stakeholder in the right way. In the present disclosure, contextual explanation for user queries is generated based on the output from AI models. Here, the impacting features are obtained from the explainer model associated with the prediction model and the contextual information is generated. Further, the contextual information is converted to the contextual explanation to the user.

9 Claims, 5 Drawing Sheets

(56) References Cited

OTHER PUBLICATIONS

Feldhus et al., "Mediators: Conversational Agents Explaining NLP Model Behavior," (2022).
Obeid et al., "Chart-to-Text: Generating Natural Language Descriptions for Charts by Adapting the Transformer Model," Proceedings of the 13th International Conference on Natural Language Generation, pp. 138-147 (2020).
Stiglic et al., "Interpretability of machine learning based prediction models in healthcare (Advanced review)," WIREs Data Mining Kowl Discov. (2020).

* cited by examiner

100

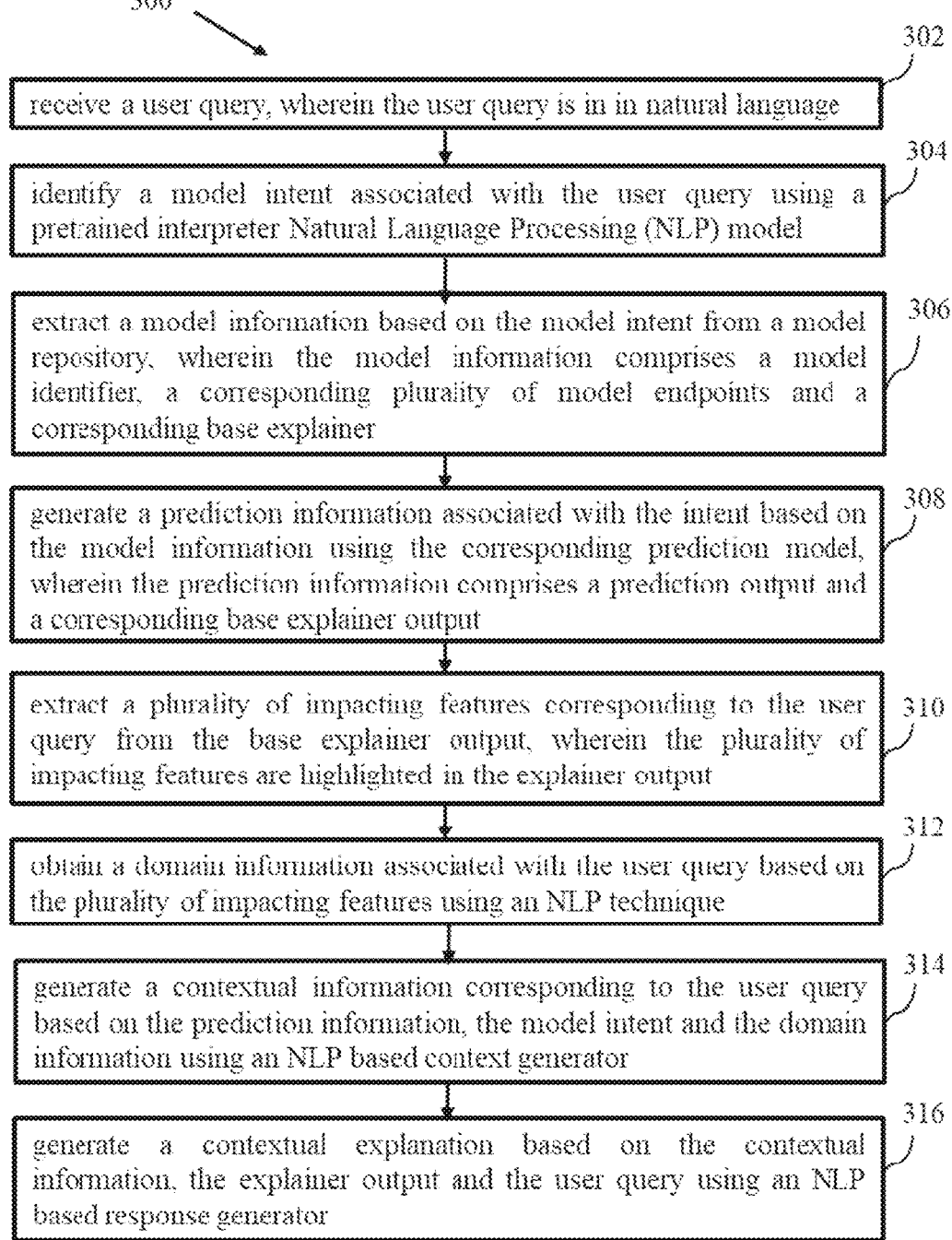

300

302
receive a user query, wherein the user query is in in natural language 304
identify a model intent associated with the user query using a pretrained interpreter Natural Language Processing (NLP) model 306
extract a model information based on the model intent from a model repository, wherein the model information comprises a model identifier, a corresponding plurality of model endpoints and a corresponding base explainer 308
generate a prediction information associated with the intent based on the model information using the corresponding prediction model, wherein the prediction information comprises a prediction output and a corresponding base explainer output 310
extract a plurality of impacting features corresponding to the user query from the base explainer output, wherein the plurality of impacting features are highlighted in the explainer output 312
obtain a domain information associated with the user query based on the plurality of impacting features using an NLP technique 314
generate a contextual information corresponding to the user query based on the prediction information, the model intent and the domain information using an NLP based context generator 316
generate a contextual explanation based on the contextual information, the explainer output and the user query using an NLP based response generator

FIG. 3

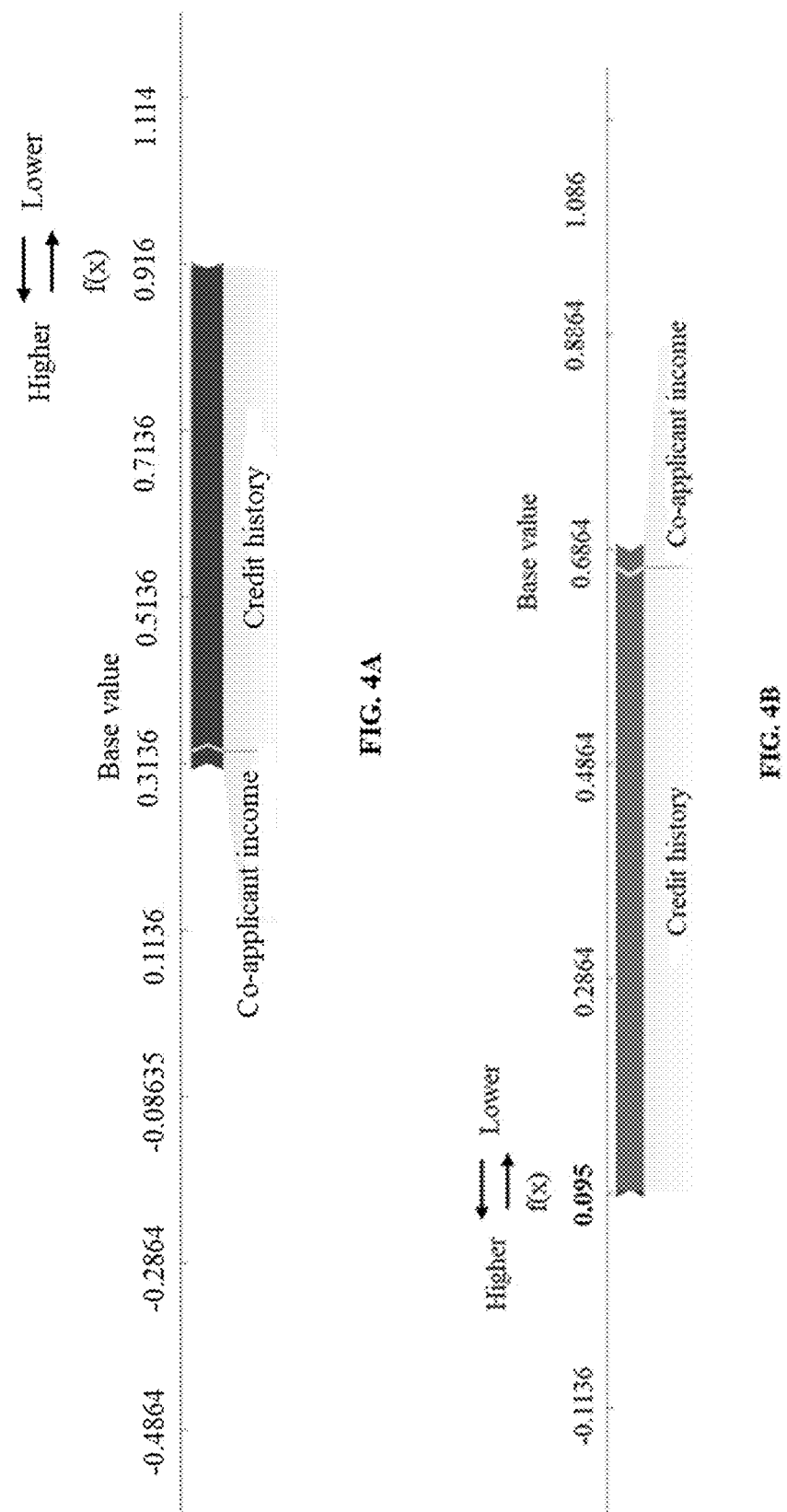

METHOD AND SYSTEM FOR GENERATING CONTEXTUAL EXPLANATION FOR MODEL PREDICTIONS

PRIORITY CLAIM

This U.S. patent application claims priority under 35 U.S.C. § 119 to: Indian Patent Application No. 202221069384, filed on Dec. 1, 2022. The entire contents of the aforementioned application are incorporated herein by reference.

TECHNICAL FIELD

The disclosure herein generally relates to the field of Machine Learning (ML) and, more particularly, to a method and system for generating contextual explanation for model predictions.

BACKGROUND

The advent of Deep Learning techniques has improved the performance of Artificial Intelligence (AI) based solutions. However, the lack of transparency in these models poses issues in their acceptance as well as in audit and compliance. Hence, explainability of the AI model is therefore a key aspect in trusting the model and its decisions. Also, explaining the model's decisions should take into consideration to whom those explanations are intended for. There are different stakeholders involved at various stages in the model lifecycle like data scientists, ML engineers, domain experts, business users, audit/compliance, and so on, and these explanations need to be relevant and understandable to them.

Conventional methods provide visibility into the reasoning behind the model's decisions. However, the conventional techniques provide outputs in the form of plots/ graphs/values, that can only be understood and analyzed by AI experts, data scientists and probably Machine Learning (ML) Engineers. There are multiple other stakeholders including domain experts and business users of the decisions made by the models, and they are often unable to comprehend these explanations, trust and derive value from these models. Further, conventional methods explain a decision by identifying attributes of the input which are important for model decision. But in general, the explanations are still in the form of numerical values, graphs and plots which are primarily aimed towards data scientist or ML engineers and in many cases not really appreciated by end user or decision makers, and domain experts. Hence the method of communicating these explanations to various stakeholders in a language that they can understand and relate to is yet to be realized.

SUMMARY

Embodiments of the present disclosure present technological improvements as solutions to one or more of the above-mentioned technical problems recognized by the inventors in conventional systems. For example, in one embodiment, a method for generating contextual explanation for model predictions is provided. The method includes receiving, by one or more hardware processors, a user query, wherein the user query is in natural language. Further, the method includes identifying, by the one or more hardware processors, a model intent associated with the user query using a pretrained interpreter Natural Language Processing (NLP) model. Furthermore, the method includes extracting, by the one or more hardware processors, a model information based on the model intent, from a model repository, wherein the model information comprises a model identifier, an associated plurality of model endpoints, and an associated base explainer. Furthermore, the method includes generating, by the one or more hardware processors, a prediction information associated with the intent based on the model information using an associated prediction model, wherein the prediction information comprises a prediction output and a corresponding base explainer output. Furthermore, the method includes extracting, by the one or more hardware processors, a plurality of impacting features associated to the user query from the base explainer output, wherein the plurality of impacting features are highlighted in the base explainer output. Furthermore, the method includes obtaining, by the one or more hardware processors, a domain information associated with the user query based on the plurality of impacting features, using an NLP technique. Furthermore, the method includes generating, by the one or more hardware processors, a contextual information corresponding to the user query based on the prediction information, the model intent, and the domain information using an NLP based context generator. Finally, the method includes generating, by the one or more hardware processors, a contextual explanation based on the contextual information, the base explainer output, and the user query, using an NLP based response generator.

In another aspect, a system for generating contextual explanation for model predictions is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a user query, wherein the user query is in natural language. Further, the one or more hardware processors are configured by the programmed instructions to identify, a model intent associated with the user query using a pretrained interpreter Natural Language Processing (NLP) model. Furthermore the one or more hardware processors are configured by the programmed instructions to extract a model information based on the model intent, from a model repository, wherein the model information comprises a model identifier, an associated plurality of model endpoints, and an associated base explainer. Furthermore, the one or more hardware processors are configured by the programmed instructions to generate a prediction information associated with the intent based on the model information using an associated prediction model, wherein the prediction information comprises a prediction output and a corresponding base explainer output. Furthermore, the one or more hardware processors are configured by the programmed instructions to extract a plurality of impacting features associated to the user query from the base explainer output, wherein the plurality of impacting features are highlighted in the base explainer output. Furthermore, the one or more hardware processors are configured by the programmed instructions to obtain a domain information associated with the user query based on the plurality of impacting features, using an NLP technique. Furthermore, the one or more hardware processors are configured by the programmed instructions to generate a contextual information corresponding to the user query based on the prediction information, the model intent, and the domain information using an NLP based context generator. Finally, the one or more hardware processors are configured by the programmed instructions to generate a contextual explanation based on the contextual information, the base explainer output, and the user query, using an NLP based response generator.

In yet another aspect, a computer program product including a non-transitory computer-readable medium having embodied therein a computer program for generating contextual explanation for model predictions is provided. The computer readable program, when executed on a computing device, causes the computing device to receive a user query, wherein the user query is in natural language. Further, the computer readable program, when executed on a computing device, causes the computing device to identify, a model intent associated with the user query using a pretrained interpreter Natural Language Processing (NLP) model. Furthermore, the computer readable program, when executed on a computing device, causes the computing device to extract a model information based on the model intent, from a model repository, wherein the model information comprises a model identifier, an associated plurality of model endpoints, and an associated base explainer. Furthermore, the computer readable program, when executed on a computing device, causes the computing device to generate a prediction information associated with the intent based on the model information using an associated prediction model, wherein the prediction information comprises a prediction output and a corresponding base explainer output. Furthermore, the computer readable program, when executed on a computing device, causes the computing device to extract a plurality of impacting features associated to the user query from the base explainer output, wherein the plurality of impacting features are highlighted in the base explainer output. Furthermore, the computer readable program, when executed on a computing device, causes the computing device to obtain a domain information associated with the user query based on the plurality of impacting features, using an NLP technique. Furthermore, the computer readable program, when executed on a computing device, causes the computing device to generate a contextual information corresponding to the user query based on the prediction information, the model intent, and the domain information using an NLP based context generator. Finally, the computer readable program, when executed on a computing device, causes the computing device to generate a contextual explanation based on the contextual information, the base explainer output, and the user query, using an NLP based response generator.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is an exemplary flow diagram illustrating a processor implemented method 300 for generating contextual explanation for model predictions implemented by the system of FIG. 1, in accordance with some embodiments of the present disclosure.

FIGS. 4A through 5 are experimental results for the processor implemented method for generating contextual explanation for model predictions implemented by the system of FIG. 1, in accordance with some embodiments of the present disclosure.

DETAILED DESCRIPTION

Figure 1:
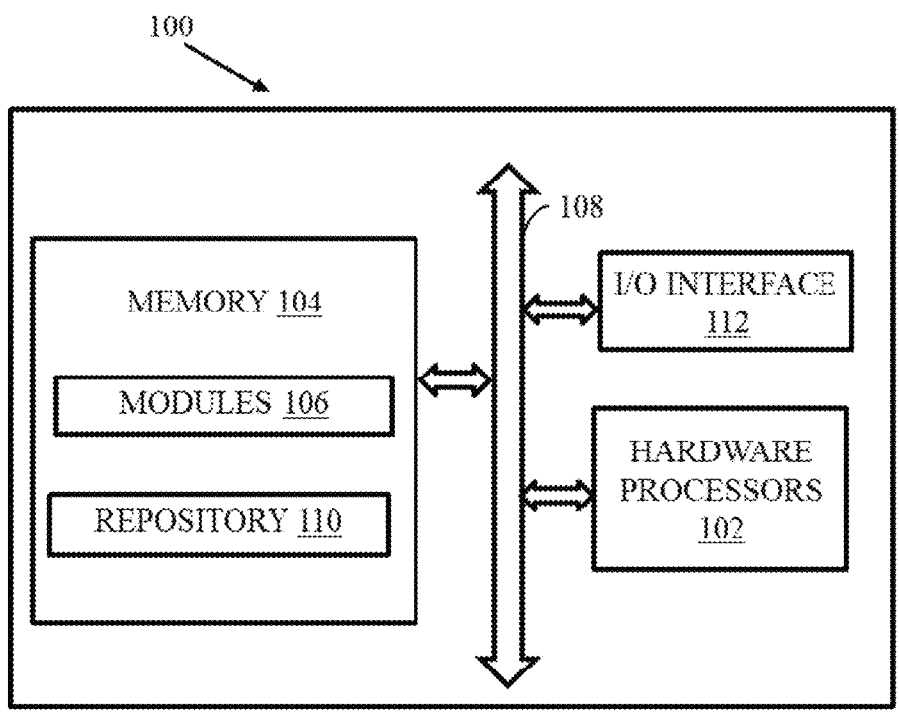
FIG. 1 is a functional block diagram of a system for generating contextual explanation for model predictions, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Human-understandable explanations of Artificial Intelligence (AI) based models are crucial to building transparency and trust in AI based solutions. More importantly, these explanations need to be contextual, applicable to the domain the model is used in, and relevant to the concerned stakeholder. Conventionally, there is a lack of communicating these explanations to various stakeholders in a language that they can understand and relate to.

One of the modes by which the model explanations could be communicated to the various stakeholders in human-understandable form is through a conversational agent. The present disclosure facilitates the conversational agents (chat bots) with intelligence and actions that would help them communicate the right information to the right stakeholder in the right way. However, the present disclosure is also applicable and relevant to any other mode of interaction with the stakeholders, like a web interface.

Embodiments herein provide a method and system for generating contextual explanation for model predictions. Considering the present disclosure, system 100 includes a main prediction ML/DL model M and a corresponding base explainer E. Let mSTORE be the database which stores model information $f_d$ which includes a model_name, a model_intent, a model_description, inputs and output of the model, link to model prediction endpoint and associated base explainer endpoint for a specific model. Let $M_{intp}$ denote an interpreter NLP model, which interprets the new explanation request. This model predicts the model_intent which allows users to select appropriate ML/DL model for prediction and respective model explainer with the help of mSTORE.

For any input explanation request, the interpreter $M_{intp}$ predicts model_intent based on the input request text (input_text). Then a query to mSTORE retrieves the model identifier and subsequently the corresponding endpoints for model M and associated base explainer E are invoked and prediction $y_m$ and base explanation $y_e$ are generated. This information is passed on to the contextual explanation generation module genExp. Based on the model_intent, $y_m$, $y_e$, and $f_d$, the genExp computes the context of the use case and then generates the appropriate explanation either using templates or Natural Language Generation (NLG) mechanism.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a functional block diagram of a processor implemented method for generating contextual explanation for model predictions, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
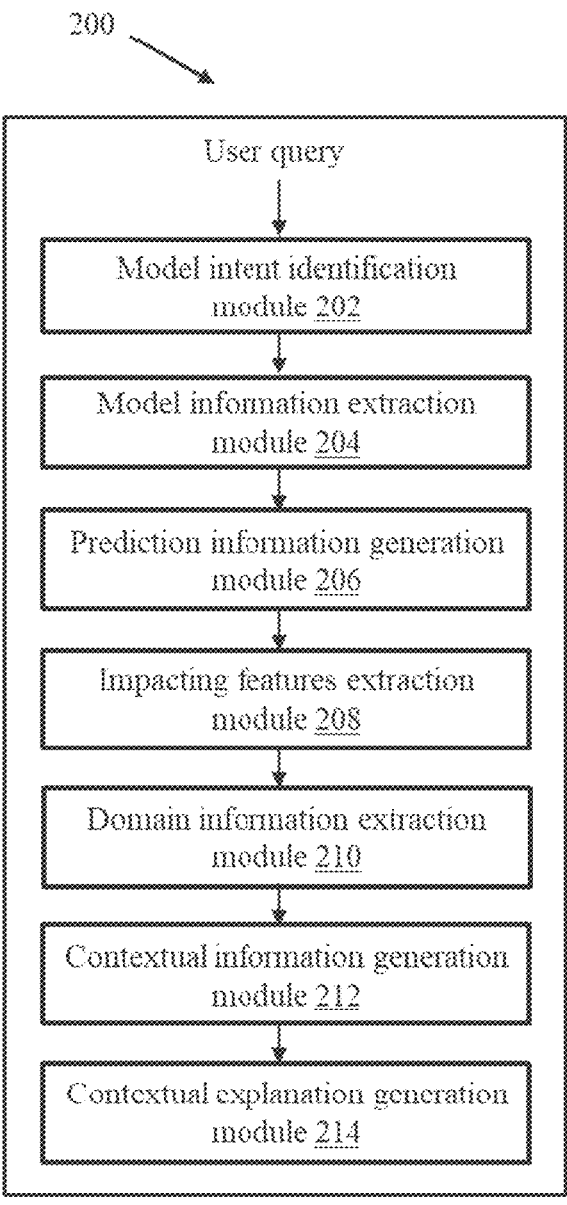
FIG. 2 illustrates a functional architecture of the system of FIG. 1, for generating contextual explanation for model predictions, in accordance with some embodiments of the present disclosure.

The plurality of modules 106 include programs or coded instructions that supplement applications or functions performed by the system 100 for generating contextual explanation for model predictions. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for generating contextual explanation for model predictions. In an embodiment, the modules 106 includes a model intent identification module (shown in FIG. 2), a model information extraction module (shown in FIG. 2), a prediction information generation module (shown in FIG. 2), an impacting features extraction module (shown in FIG. 2), a domain information extraction module (shown in FIG. 2), a contextual information generation module (shown in FIG. 2) and a contextual explanation generation module (shown in FIG. 2). In an embodiment, FIG. 2 illustrates a functional architecture of the system of FIG. 1, for generating contextual explanation for model predictions, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository) 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 3.

FIG. 3 is an exemplary flow diagram illustrating a processor implemented method 300 for generating contextual explanation for model predictions implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIG. 3. The method 300 may be described in the general context of computer executable instructions. Generally, the computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 are configured by the programmed instructions to receive a user query in natural language. The user query includes a prediction requests or explanation requests. In an embodiment, the user query is received by a conversational bot and in another embodiment, the user query is received via a user interface. For example, considering a loan status prediction model, a sample user query is "may I know the reason for denying my loan request".

Now referring to FIG. 3, at step 304 of the method 300, the model intent identification module 202 executed by one or more hardware processors 102 is configured by the programmed instructions to identify a model intent associated with the user query using a pretrained interpreter Natural Language Processing (NLP) model. In an embodiment, the interpreter NLP model is trained with a plurality of input stories. Each input story is a sequence of conversation and a corresponding action generated by a conversational bot as a response to a user. For example, considering the user query "may I know the reason for denying my loan request", the model intent identified by the interpreter NLP is "explain_model_decision".

At step 306 of the method 300, the model information extraction module 204 executed by the one or more hardware processors 102 is configured by the programmed instructions to obtain a model information based on the model intent from a model repository. The model information comprises a model identifier, a corresponding plurality of model endpoints and a corresponding base explainer. In an embodiment, the base explainer is an algorithm which generates required metrics. For example gradient based base explainers computes changes in output with respect to change in inputs. In another embodiment, the base explainer is a visualization tool to visualize the outputs associated with Machine Learning (ML) models with required metrics. For example SHapely Additive explanations (SHAP) and Local Interpretable Model-agnostic Explanations (LIME) methods, which provides summary of feature importance in graphical form.

At step 308 of the method 300, the prediction information generation module 206 executed by the one or more hardware processors 102 is configured by the programmed instructions to obtain a prediction information associated with the intent based on the model information using the corresponding prediction model. The prediction information includes a prediction output and a corresponding base explainer output.

In an embodiment, considering the loan status prediction model, which takes applicant income and credit history data as input and predicts whether the loan will be approved or not, a Randomforest model was trained and deployed for making predictions. The input vector consists of features like Gender, Married, Dependents, Education, Self_Employed, ApplicantIncome, CoapplicantIncome, LoanAmount, Loan_Amount_Term, Credit_History, Property_Area. The model predicts the outcome as Loan_Status=Y or N as given in Table I.

TABLE I

| Features | Value |
|---|---|
| Loan_ID | LP001565 |
| Gender | Male |
| Married | Yes |
| Dependents | 1 |
| Education | Graduate |
| Self_Employed | No |
| ApplicantIncome | 3089 |
| CoapplicantIncome | 1280 |
| LoanAmount | 121 |
| Loan_Amount_Term | 360 |
| Credit_History | 0 |
| Property_Area | Semiurban |

TABLE I-continued

| Features | Value |
|---|---|
| Loan_Status | N |

In an embodiment, SHAP is used for performing force plot as shown in FIGS. 4A and 4B which depicts contribution of each input feature in model prediction or model output.

At step 310 of the method 300, the impacting features extraction module 208 executed by the one or more hardware processors 102 is configured by the programmed instructions to extract a plurality of impacting features corresponding to the user query from the base explainer output. In an embodiment, the plurality of impacting features are highlighted in the explainer output. For example, considering the example plot shown in FIG. 4, the plurality of impacting features are credit history and co-applicant income.

At step 312 of the method 300, the domain information extraction module 210 executed by the one or more hardware processors 102 is configured by the programmed instructions to obtain a domain information associated with the user query based on the plurality of impacting features using an NLP technique. For example, based on feature names like credit history, applicant income, co-applicant income and output as loan_status, domain is derived as loan_application.

At step 314 of the method 300, the contextual information generation module 212 executed by the one or more hardware processors 102 is configured by the programmed instructions to generate a contextual information corresponding to the user query based on the prediction information, the model intent and the domain information using an NLP based context generator. For example, approval of loan based on the details of the applicant (credit_history, income etc.).

In an embodiment, the NLP based context generator is a NLP classifier model, that takes in input of feature_names target_class (expected output), and chat conversation text, and generates context (For example approval of loan based on the details of the applicant).

At step 316 of the method 300, the contextual explanation generation module 214 executed by the one or more hardware processors 102 is configured by the programmed instructions to generate a contextual explanation based on the contextual information, the explainer output and the user query using an NLP based response generator. For example, considering the loan approval model, the contextual explanation to the user for the user query "may I know the reason for denying my loan request" is "The loan is denied because your income is low for the loan amount and the credit history is also not good."

In an embodiment, the NLP based response generator generates the contextual explanation using a template based contextual explanation generation technique. The template based contextual explanation generation technique generates the contextual explanation by identifying a corresponding template from a plurality of templates. For example "loan is approved because of high Credit_History (1.0), Property_Area (Urban) and high ApplicantIncome (3200)". Another example is "Though Property_Area is (Semiurban), ApplicantIncome is high (3036), Loan is rejected because Credit_History is low (0.0)".

In an embodiment, the NLP based response generator generates the contextual explanation using a NLG based contextual explanation generation technique. For example, inputs to NLG are: John|rejected|credit history|poor|applicant income|25000 . . . and the generated output is: "Loan is rejected because John is a poor creditor".

In an embodiment, the pseudocode for implementing the present disclosure is explained in conjunction with pseudo-codes 1 and 2 given below.

---

Pseudocode 1: ExpMain main process
for context based explanation

---

```
Data: Database mSTORE, Interpreter NLP model M__intp,
input__story, machine learning model M, model data f_d ,Base explainer E
Data: input__text, Input x
Result: Context based response
if (mode == Register) then:
    mSTORE.update(M, f__d, E);
    loss = M__intp.train(input__story);
    output = genExp(f__d, ctxGen.train = TRUE);
    return M__intp, output;
end
if (mode == Explain) then :
    intent = M__intp.predict(input__text);
    {M, E} = mSTORE.query(intent);
    y_m = M.predict(x);
    y_e = E.explain(M,x);
    output = genExp(intent, f__d, x, y__m, y__e,
    ctxGen.predict = TRUE);
    return output
end
```

---

Pseudocode 1 depicts the complete process of contextual explanation for the machine learning model prediction for a specific input x. In the following describe genExp algorithm which generates the contextual explanation. The contextual explanation generation is accomplished through two approaches namely an NLG based method which generates the required text based on $f_d$, $y_m$ and $y_e$. The other method is a twostep method which first predicts the context of the input query based on the $f_d$ and model intent predicted by the NLP model Mintp in the previous step. The output of this step is further consumed by the template based response generator. First, an appropriate template is selected based on the context, domain and it is populated with the numerical values based on x, $y_m$ and $y_e$.

Now referring to pseudocode 1, as a first step, the new model M is registered with associated model data fd along with the model prediction and base explanation endpoints. This involves updating the mSTORE with $f_d$, training the Mintp with input_story. Along with this the NLP models Mctx and NLGen are also trained for the new model and its associated data. In the explanation mode, input text (conversation) is passed to the Mintp, it understands the input text and interprets the intent (loan_reject_explain). Next, mSTORE is queried using the model intent and the associated model name (e.g. loan_approval), model prediction and explainer endpoint are invoked. Model prediction $y_m$ and corresponding base explanation $y_e$ are generated. The model prediction $y_m$, explainer output $y_e$ (feature importance values, base values) and model_intent are presented to context generator which generates the context (e.g. loan_reject-ed_credit_income_marital_dependents).

In an embodiment, pseudocode 2 receives the numerical values based on x, $y_m$ and $y_e$ from the pseudocode 1 and generates a template identifier. A template is selected based on the identifier and populated with appropriate values from ye and final text is produced as output.

---

Pseudocode 2: genExp generates contextual
explanation for model M predictions

---

```
Data: Data features f_d , Input point x, model prediction y_m, and
corresponding explainer output y_e , target__class, intent
Result: Explanation text for model prediction
if ctxGen.predict == TRUE then:
    if flag == TRUE then:
        load NLP models Mdom,Mctx;
        context = M__ctx.predict(intent, f__d, y__m);
        output = respGen(context, x, y__e);
    end
    else:
        output = NLGen.predict(f__d,target__class, x,c,y__m, y__e);
    end
end
else if ctxGen.train == TRUE then:
    load training data D;
    loss = model.train(D__ctx, NLGen);
    output = M__ctx, NLGen;
end
    return output
```

---

EXPERIMENTATION DETAILS

Figure 5:
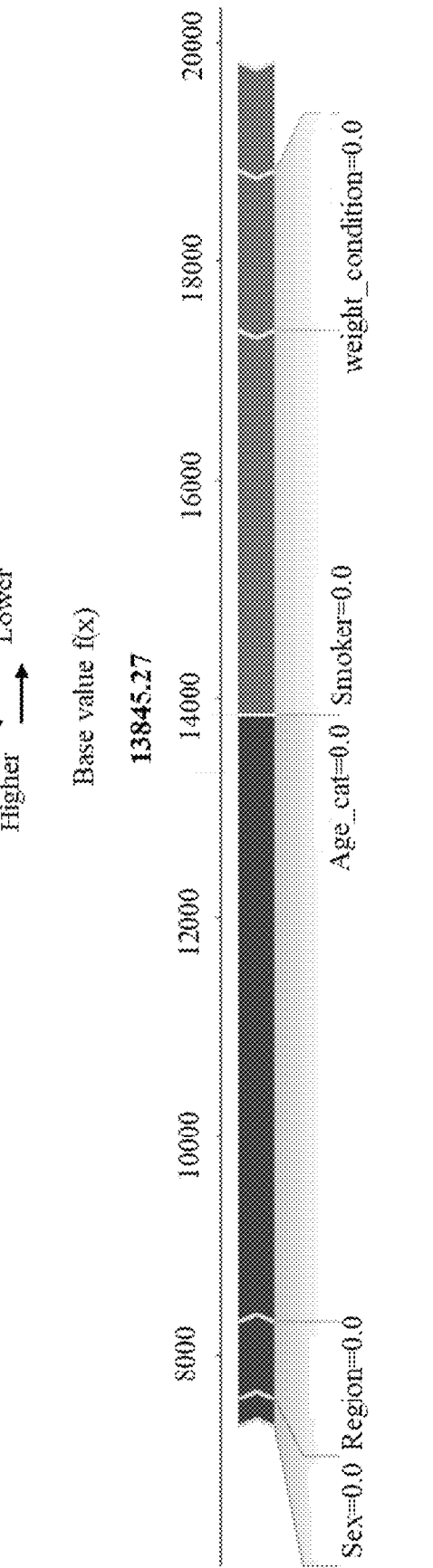

In an embodiment, the present disclosure was experimented with a medical premium model. A regressor model was trained and deployed for estimating the medical premium charges. The input vector includes features like age, sex, Body Mass Index (BMI), children, smoking habit and the like as shown in Table II. The model predicts the premium charges for applicants based on the mentioned features. Now referring to Table II, the medical premium prediction is 30087.22 dollars and the corresponding SHAP output is given in FIG. 5. Now referring to FIG. 5, depicts the contribution of features like age, weight condition, region (categorical encoded) in predicting the medical premium (output) using ML model. The contextual explanation generated by the present disclosure for the user query "what is the reason for high premium?" is "The premium charges are higher because of smoking and higher weight".

TABLE II

| Features | Value |
| --- | --- |
| Age | 55.00 |
| Diabetes | 0.00 |
| BloodPressureProblems | 1.00 |
| AnyTransplants | 0.00 |
| AnyChronicDiseases | 0.00 |
| Height | 159.00 |
| Weight | 91.00 |
| KnownAllergies | 1.00 |
| HistoryOfCancerInFamily | 0.00 |
| NumberOfMajorSurgeries | 1.00 |
| AgeLabel_Teen | 0.00 |
| AgeLabel_Young | 0.00 |
| AgeLabel_Middle | 0.00 |
| AgeLabel_Old | 1.00 |
| AgeLabel_SuperOld | 0.00 |
| predict | 30087.22 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of generating contextual explanation for model predictions. The present disclosure generates contextual explanation for user queries based on the output from AI models. Here, the impacting features are obtained from the explainer model associated with the prediction model and the contextual information is generated. Further, the contextual information is converted to the contextual explanation to the user.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors, a user query, wherein the user query is in natural language;

identifying, by the one or more hardware processors, a model intent associated with the user query using a pretrained interpreter Natural Language Processing (NLP) model, wherein the pretrained interpreter NLP model is trained with a plurality of input stories, wherein each input story is a sequence of conversation and a corresponding action generated by a conversational bot as a response to a user;

extracting, by the one or more hardware processors, a model information based on the model intent, from a model repository by querying the model repository, wherein the model information comprises a model identifier, an associated plurality of model endpoints, and an associated base explainer, wherein the base explainer is a visualization tool to visualize the outputs associated with Machine Learning (ML) models with required metrics, wherein the model repository is a database for storing the model information including a model name, the model intent, a model description, inputs and output of a model, a link to a model prediction endpoint and the associated base explainer for a specific model, and wherein the pretrained interpreter NLP model predicts the model intent which allows the user to select a ML model for prediction and respective explainer model using the model repository;

generating, by the one or more hardware processors, a prediction information associated with the intent based on the model information using an associated prediction model, wherein the prediction information comprises a prediction output and a corresponding base explainer output;

extracting, by the one or more hardware processors, a plurality of impacting features associated to the user query from the base explainer output, wherein the plurality of impacting features are highlighted in the base explainer output, wherein the plurality of impacting features are obtained from an explainer model associated with the prediction model;

obtaining, by the one or more hardware processors, a domain information associated with the user query based on the plurality of impacting features, using an NLP technique;

generating, by the one or more hardware processors, a contextual information corresponding to the user query based on the prediction information, the model intent, and the domain information using an NLP based context generator;

generating, by the one or more hardware processors, a contextual explanation based on the contextual information, the base explainer output, and the user query, using an NLP based response generator; and communicating, by the one or more hardware processors, the generated contextual explanation to a plurality of stakeholders in a language understandable by the plurality of stakeholders and related to the plurality of stakeholders via the conversational bot or a user interface, wherein the generated contextual explanation is a human-understandable explanation.

2. The processor implemented method of claim 1, wherein the NLP based response generator generates the contextual explanation using one of a) a template based contextual explanation generation technique, and b) a Natural Language Generation (NLG) based contextual explanation generation technique, wherein the template based contextual explanation generation technique generates the contextual explanation by identifying an associated template from a plurality of templates, wherein the associated template is identified based on the contextual information and the domain information, and wherein the associated template is populated with numerical values based on the user query, the prediction information and the base explainer output.

3. The method of claim 1, wherein the user query is received by the conversational bot or via the user interface.

4. A system comprising:

at least one memory storing programmed instructions; one or more Input/Output (I/O) interfaces; and one or more hardware processors operatively coupled to the at least one memory, wherein the one or more hardware processors are configured by the programmed instructions to:

receive a user query, wherein the user query is in natural language;

identify a model intent associated with the user query using a pretrained interpreter Natural Language Processing (NLP) model, wherein the pretrained interpreter NLP model is trained with a plurality of input stories, wherein each input story is a sequence of conversation and a corresponding action generated by a conversational bot as a response to a user;

extract a model information based on the model intent, from a model repository by querying the model repository, wherein the model information comprises a model identifier, an associated plurality of model endpoints, and an associated base explainer, wherein the base explainer is a visualization tool to visualize the outputs associated with Machine Learning (ML) models with required metrics, wherein the model repository is a database for storing the model information including a model name, the model intent, a model description, inputs and output of a model, a link to a model prediction endpoint and the associated base explainer for a specific model, and wherein the pretrained interpreter NLP model predicts the model intent which allows the user to select a ML model for prediction and respective explainer model using the model repository;

generate a prediction information associated with the intent based on the model information using an associated prediction model, wherein the prediction information comprises a prediction output and a corresponding base explainer output;

extract a plurality of impacting features associated to the user query from the base explainer output, wherein the plurality of impacting features are highlighted in the base explainer output, wherein the plurality of impacting features are obtained from an explainer model associated with the prediction model;

obtain a domain information associated with the user query based on the plurality of impacting features, using an NLP technique;

generate a contextual information corresponding to the user query based on the prediction information, the model intent, and the domain information using an NLP based context generator;

generate a contextual explanation based on the contextual information, the base explainer output, and the user query, using an NLP based response generator; and communicate the generated contextual explanation to a plurality of stakeholders in a language understandable by the plurality of stakeholders and related to the plurality of stakeholders via the conversational bot or a user interface, wherein the generated contextual explanation is a human-understandable explanation.

5. The system of claim 4, wherein the NLP based response generator generates the contextual explanation using one of a) a template based contextual explanation generation technique, and b) a Natural Language Generation (NLG) based contextual explanation generation technique, wherein the template based contextual explanation generation technique generates the contextual explanation by identifying an associated template from a plurality of templates.

6. The system of claim 4, wherein the user query is received by the conversational bot or via the user interface.

7. One or more non-transitory machine-readable information storage mediums comprising one or more instructions which when executed by one or more hardware processors cause:

receiving a user query, wherein the user query is in natural language;

identifying a model intent associated with the user query using a pretrained interpreter Natural Language Processing (NLP) model, wherein the pretrained interpreter NLP model is trained with a plurality of input stories, wherein each input story is a sequence of conversation and a corresponding action generated by a conversational bot as a response to a user;

extracting a model information based on the model intent, from a model repository by querying the model repository, wherein the model information comprises a model identifier, an associated plurality of model endpoints, and an associated base explainer, wherein the base explainer is a visualization tool to visualize the outputs associated with Machine Learning (ML) models with required metrics, wherein the model repository is a database for storing the model information including a model name, the model intent, a model description, inputs and output of a model, a link to a model prediction endpoint and the associated base explainer for a specific model, and wherein the pretrained interpreter NLP model predicts the model intent which allows the user to select a ML model for prediction and respective explainer model using the model repository;

generating a prediction information associated with the intent based on the model information using an associated prediction model, wherein the prediction information comprises a prediction output and a corresponding base explainer output;

extracting a plurality of impacting features associated to the user query from the base explainer output, wherein the plurality of impacting features are highlighted in the base explainer output, wherein the plurality of impacting features are obtained from an explainer model associated with the prediction model;

obtaining a domain information associated with the user query based on the plurality of impacting features, using an NLP technique;

generating a contextual information corresponding to the user query based on the prediction information, the model intent, and the domain information using an NLP based context generator;

generating a contextual explanation based on the contextual information, the base explainer output, and the user query, using an NLP based response generator; and communicating the generated contextual explanation to a plurality of stakeholders in a language understandable by the plurality of stakeholders and related to the plurality of stakeholders via the conversational bot or a user interface, wherein the generated contextual explanation is a human-understandable explanation.

8. The one or more non-transitory machine-readable information storage mediums of claim 7, wherein the NLP based response generator generates the contextual explanation using one of a) a template based contextual explanation generation technique, and b) a Natural Language Generation (NLG) based contextual explanation generation technique, wherein the template based contextual explanation generation technique generates the contextual explanation by identifying an associated template from a plurality of templates.

9. The one or more non-transitory machine-readable information storage mediums of claim 7, wherein the user query is received by one of (i) the conversational bot and (ii) the user interface.

* * * * *